United States Patent
Chaudhuri et al.

(10) Patent No.: US 6,862,380 B2
(45) Date of Patent: Mar. 1, 2005

(54) TRANSPARENT OPTICAL SWITCH

(75) Inventors: Sid Chaudhuri, East Brunswick, NJ (US); Evan L. Goldstein, Little Silver, NJ (US)

(73) Assignee: AT&T Corp., New York, NY (US)

( * ) Notice: Subject to any disclaimer, the term of this patent is extended or adjusted under 35 U.S.C. 154(b) by 396 days.

(21) Appl. No.: 09/775,429

(22) Filed: Feb. 1, 2001

(65) Prior Publication Data

US 2005/0008284 A1 Jan. 13, 2005

Related U.S. Application Data

(60) Provisional application No. 60/180,347, filed on Feb. 4, 2000.

(51) Int. Cl.$^7$ .............................. G02B 6/35; H04B 10/08
(52) U.S. Cl. ........................................... 385/17; 398/19
(58) Field of Search .............................. 398/19, 12, 48, 398/50, 55, 56; 385/16, 17

(56) References Cited

U.S. PATENT DOCUMENTS

| | | | |
|---|---|---|---|
| 5,317,439 A | * 5/1994 | Fatehi et al. ................... | 398/19 |
| 5,383,177 A | 1/1995 | Tateishi | |
| 5,663,820 A | 9/1997 | Shiragaki | |
| 5,859,939 A | 1/1999 | Fee et al. | |
| 5,867,289 A | * 2/1999 | Gerstel et al. ................. | 398/12 |
| 5,914,794 A | 6/1999 | Fee et al. | |
| 5,937,117 A | 8/1999 | Ishida et al. | |
| 6,005,697 A | 12/1999 | Wu et al. | |
| 6,084,694 A | 7/2000 | Milton et al. | |
| 6,115,155 A | 9/2000 | Liu et al. | |
| 6,115,517 A | 9/2000 | Shiragaki et al. | |
| 6,128,115 A | 10/2000 | Shiragaki | |
| 6,154,587 A | 11/2000 | Okayama | |
| 6,198,856 B1 | * 3/2001 | Schroeder et al. ............. | 385/17 |
| 6,301,402 B1 | * 10/2001 | Bhalla et al. ................... | 385/16 |
| 6,600,581 B1 | * 7/2003 | Fatehi et al. .................... | 398/9 |
| 2002/0041409 A1 | * 4/2002 | Laham et al. ................ | 359/110 |
| 2002/0191890 A1 | * 12/2002 | Gottlieb et al. ............... | 385/16 |

FOREIGN PATENT DOCUMENTS

| | | |
|---|---|---|
| EP | 0938244 | 8/1999 |
| EP | 0964487 | 12/1999 |
| EP | 1081982 | 3/2001 |

* cited by examiner

*Primary Examiner*—Rodney Bovernick
*Assistant Examiner*—Mike Stahl

(57) ABSTRACT

A transparent optical switch includes network management and performance monitoring using bit level information obtained by extracting selected information on a polling basis and analyzing the extracted information in the electrical domain. In one embodiment, a signal is injected into the switch fabric of the switch via a demultiplexing device. The injected signal is extracted at the output of the switching fabric via an N:1 switch and analyzed by a signal analyzer to verify input to output connections. In another embodiment, an optical switch includes first and second switch fabrics for 1:2 broadcast capability. In a further embodiment, an optical communication system includes a plurality of optical networks and a plurality of optical switches that cooperate to generate unequipped signals and to obtain autonomously switch-to-switch port connectivity information required for auto-topology discovery.

2 Claims, 9 Drawing Sheets

TRANSPARENT OPTICAL SWITCH

CROSS REFERENCE TO RELATED APPLICATIONS

This application claims the benefit of U.S. Provisional Patent Application No. 60/180,347, filed on Feb. 4, 2000.

STATEMENT REGARDING FEDERALLY SPONSORED RESEARCH

Not Applicable.

FIELD OF THE INVENTION

The present invention relates generally to communication systems, and more particularly, to optical communication networks.

BACKGROUND OF THE INVENTION

Conventional optical networks generally include switch devices that provide a connection between an input port and an output port to establish a channel between first and second optical links. Such switches typically convert the optical signals to electrical signals to make the input/output connections. The switch examines the data stream at a bit level to perform network management and performance monitoring functions. For example, frame headers can contain source and destination information used to route a constant bit-rate data stream in the network. Performance monitoring can include examining selected overhead data to detect and isolate errors within the network.

However, switches that convert data from the optical domain to the electrical domain and back to the optical domain can create an impediment to achieving the bandwidths that developing optical networking technologies potentially offer. For example, dense wave division multiplexing (DWDM) systems multiplex a series of optical signals having varying wavelengths into a single optical fiber. A fiber has a plurality of parallel channels each associated with a particular wavelength. The channel wavelengths have a predetermined spacing to minimize certain effects, e.g., cross talk, and to maximize the number of channels that a fiber can carry.

A switch interfaces with input ports and output ports to provide desired signal paths between selected input and output ports of two DWDM systems. The switch typically provides network management, signal restoration, provisioning, grooming and some level of signal monitoring.

Transparent optical switches refer to switches that do not convert optical signals to electrical signals. An exemplary switch is shown and described in U.S. Pat. No. 5,937,117, to Ishida et al., which is incorporated herein by reference. One disadvantage associated with known transparent optical switches is the limited ability to examine and extract necessary information carried within the optical signal. Thus, adequate network management, performance monitoring, and control within the optical network is relatively complex, costly, and unreliable.

It would, therefore, be desirable to provide a transparent optical switch having enhanced performance monitoring, network management and control functionality.

SUMMARY OF THE INVENTION

The present invention provides a transparent optical switch for a wave division multiplexing (WDM) based network having optical pass through paths and optoelectronic signal conversion for client interfaces in accordance with the present invention. This arrangement provides path level signal control and performance monitoring. While the invention is primarily shown and described in conjunction with a dense wave division multiplexing (DWDM) system, it will be appreciated that the invention is applicable to optical systems in general in which it is desirable to provide optical signal pass through paths through a switch with efficient performance monitoring, network management, control and fault detection. For example, the invention is applicable to WDM systems without optoelectronic conversion.

In one aspect of the invention, an optical network includes an optical switch that extracts predetermined optical data traffic on a polling basis. The extracted information is converted to the electrical domain and examined at the bit level. In one embodiment, the system can extract data from input and/or output ports of the switch to verify connections through the switch. Selected data can be injected into the optical switch via input ports and extracted from output ports for analysis by signal analyzers. This arrangement also enables performance monitoring of the optical data stream by tapping selected data.

In a further aspect of the invention, an optical switch includes first and second switch fabrics for providing 1:2 broadcast capability. Each switch input port splits an input signal into a first signal received by the first switch fabric and a second signal received by the second switch fabric. In normal operation, the same output port receives the first and second signals and selects only one so that if one of the switch fabrics fails, the output port can select the signal from the operational switch fabric. Thus, the first and second switch fabrics provide redundancy.

The first and second switch fabrics can be used for bridging a signal from one input port to two output ports. The first switch fabric connects an input signal to the first output port and the second switch fabric connects the same input signal to the second output port. In one embodiment, the redundant switch fabrics are used for bridging by sacrificing the fabric redundancy.

In another aspect of the invention, an optical communication system includes first and second optical switches between which optical networks, such as DWDM networks, are coupled. The switches and the DWDM networks combine to provide unequipped signal generation. In an exemplary embodiment, transponders are located at section termination points in the DWDM networks. The transponders detect unequipped connections and generate unequipped or so a led keep-alive signals to the switch, which loops the signal back to an associated switch. With this arrangement, unequipped conditions are detected and so-called keep alive or unequipped signals are generated as needed without unequipped signal generation within the transparent crossconnect system.

In a further aspect of the invention, an optical communication system includes transparent optical switches and a DWDM network. The DWDM network inserts port ID information into signal overheads, for example, of data traveling to a first optical switch from a second switch. Similarly, the DWDM network inserts port ID information into signal overhead of data traveling from the first switch to the second switch. In an exemplary embodiment, transponders associated with the DWDM ports can detect and insert port ID information. The first and second switches can exchange port ID information to identify port connections between the switches. This arrangement enables the optical communication system to automatically determine the network topology, e.g., automatic topology discovery.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
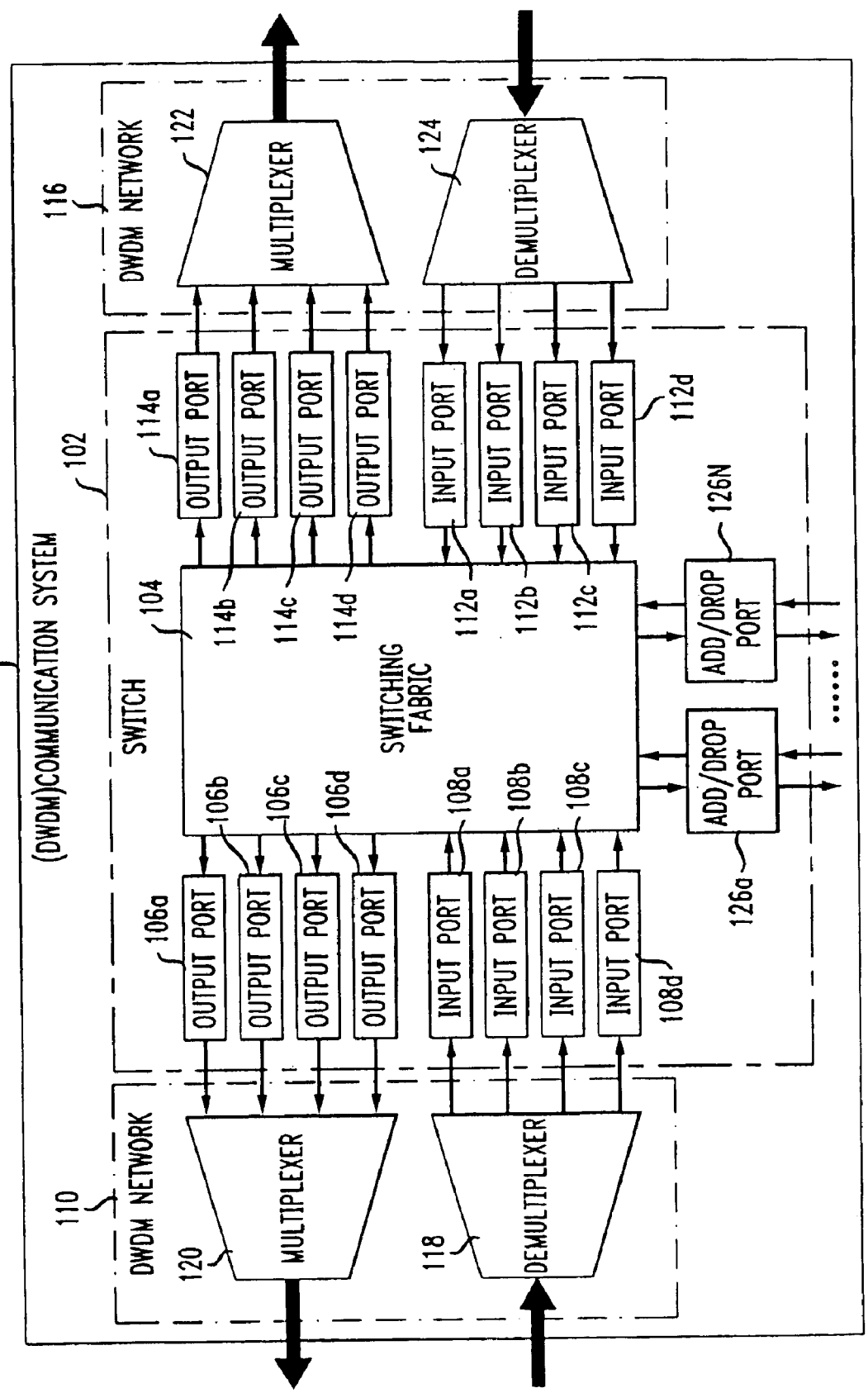
FIG. 1 is a schematic depiction of a transparent optical switch in accordance with the present invention.

FIG. 1 shows a portion of a dense wave division multiplexing (DWDM) communication system 100 having a transparent optical switch 102 in accordance with the present invention. As used herein, transparent and non-blocking optical switches refer to optical switches that do not convert optical signals to electrical signals for signals that pass through the switch, i.e., not add/drop signals. The switch 102 includes switching fabric 104 that interfaces with a first set of output ports 106a–d and a first set of input ports 108a–d coupled to a first DWDM network 110. A second set of input ports 112a–d and a second set of output ports 114a–d are coupled to a second DWDM network 116. The ports 106,108,112,114, in combination with the switching fabric 104 provide bi-directional communication between the first and second DWDM networks 110,116.

The first set of input ports 108 receive respective channel data from a first DWDM demultiplexer 118 and the first set of output ports provide channel data to a first DWDM multiplexer 120. The first multiplexer 120 and the first demultiplexer 118 can form a part of the first DWDM network 110. Similarly, the second set of input and output ports 112,114 provide input and output channels to a second multiplexer 122 and a second demultiplexer 124 associated with the second DWDM network 116.

The cross-connect 102 further includes add/drop ports 126a–N that convert the optical signals from the switching fabric 104 to electrical signals. In an exemplary embodiment, a SONET/SDH configuration is used in combination with regenerator section and multiplex section termination points RSTP, MSTP. As known to one of ordinary skill in the art, the Regenerator Section Overhead (RSOH) and Multiplex Section Overhead (MSOH) are terminated and processed at the termination points RSTP, MSTP. Bytes at the termination points are used for network level functions, such as performance monitoring, in-band data communication, and protection switching signaling.

With this arrangement, the DWDM networks are not integrated into the switch 102 to provide multi-vendor compatibility. The transponders within the DWDM systems convert the closely spaced channels multiplexed within a single fiber to electrical signals and then converts the electrical signals back to standardized optical signals. Due to the innovative nature of wavelength multiplexing technology there is no one standard for the closely spaced wavelength channels. Therefore, it is not currently possible to use a WDM system from one vendor and pass a signal through a switch from another vendor and then pass it through another WDM system from yet another vendor. One way to enable equipment from various vendors to interconnect the WDM systems is via standard single channel optical interfaces through an optical switch.

Figure 2:
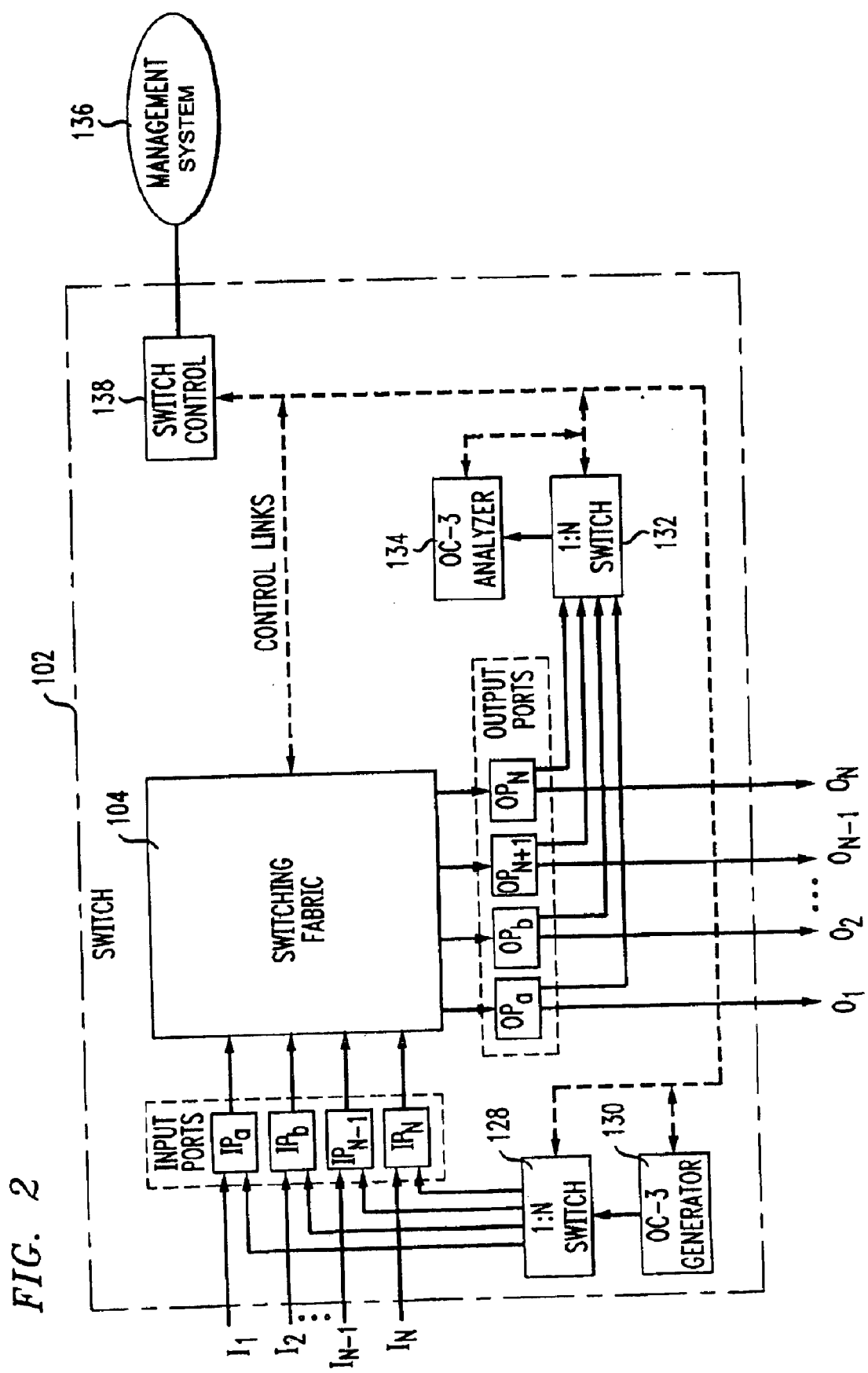
FIG. 2 is a schematic depiction of a transparent optical switch providing switch fabric connection verification in accordance with the present invention.

FIG. 2 shows further details of a transparent optical switch 102 having connection verification in accordance with the present invention. The optical switch can be substantially similar to that shown in FIG. 1, in which like reference numbers indicate like elements. The switch 102 includes switch fabric 104 that interfaces with input and output ports IPa–N,OPa–N. A demultiplexing 1:N switch 128 is coupled to an optical signal generator 130, which can be provided, for example, as an OC-N(N=3, 12, 48, 192) generator. It is well known to one of ordinary skill in the art that OC-N refers to a standard SONET signal format and rate. The 1:N switch 128 provides a connection of respective signals to each of the input ports IPa–N to the OC-N generator on a polling basis.

A multiplexing N:1 switch 132 is connected to each of the output ports OPa–N for providing signal information to a first signal analyzer 134, which can be an OC-N analyzer. A network management system 136 can control the overall switch 102 functionality and connection verification via a switch control 138, which can be coupled to the switching fabric 104, the switches 128,132 and the signal generators and analyzers 130,134.

Input/output connections through the switch fabric 104 can be verified by selectively switching in, via the 1:N switch 128, a predetermined signal generated by the signal generator 130 on a polling basis, i.e., one port at a time. In one embodiment, a relatively low speed, e.g., OC-3 (155.52 Mb/s SONET signal), connection verification signal from the signal generator 130 is provided to the input ports IP via the 1:N switch. This optical signal uses a frequency different from the frequencies of the bearer signal at input port IP interfaces. The injected signal is extracted at the output ports OP after passing through the switch fabric 104 and is provided to the first signal analyzer 134 on a polling basis via the N:1 switch 132. The signal analyzer 134 can determine a bit error rate (BER) for the injected signal.

The switch control 138 coordinates the 1:N switch 128 and N:1 switch 132 configurations. If the switch control 138 commands the 1:N switch 128 to connect to input IPi and commands the switch fabric 102 to connect IPi to OPj then it also commands the OC-3 generator to insert the expected connection information IPi-OPj within the OC-3 signal. Then the switch control 138 also commands the N:1 switch 132 to select an output port OPj to the OC-3 analyzer 134. If the switch fabric 104 makes the connection properly the OC-3 signal received at 134 will contain the IPi-OPj connectivity information. The proper connection is then verified. If no signal is received or the received signal contains different connection information misconnection is identified.

It is understood that one of ordinary skill in the art can readily select and multiplex/demultiplex a series of optical signal generators and analyzers to meet the bandwidth requirements of a particular application. It is further understood that the polling of inputs and outputs can be varied to inject and extract selected signals and is not limited to one input and/or one output at any one time. In addition, the term switch, such as 1:N, and N:1 switch, is to be construed broadly to include devices that selectively provide at least one signal path for one or more input/output signals to facilitate polling of the input and/or output ports.

Figure 3:
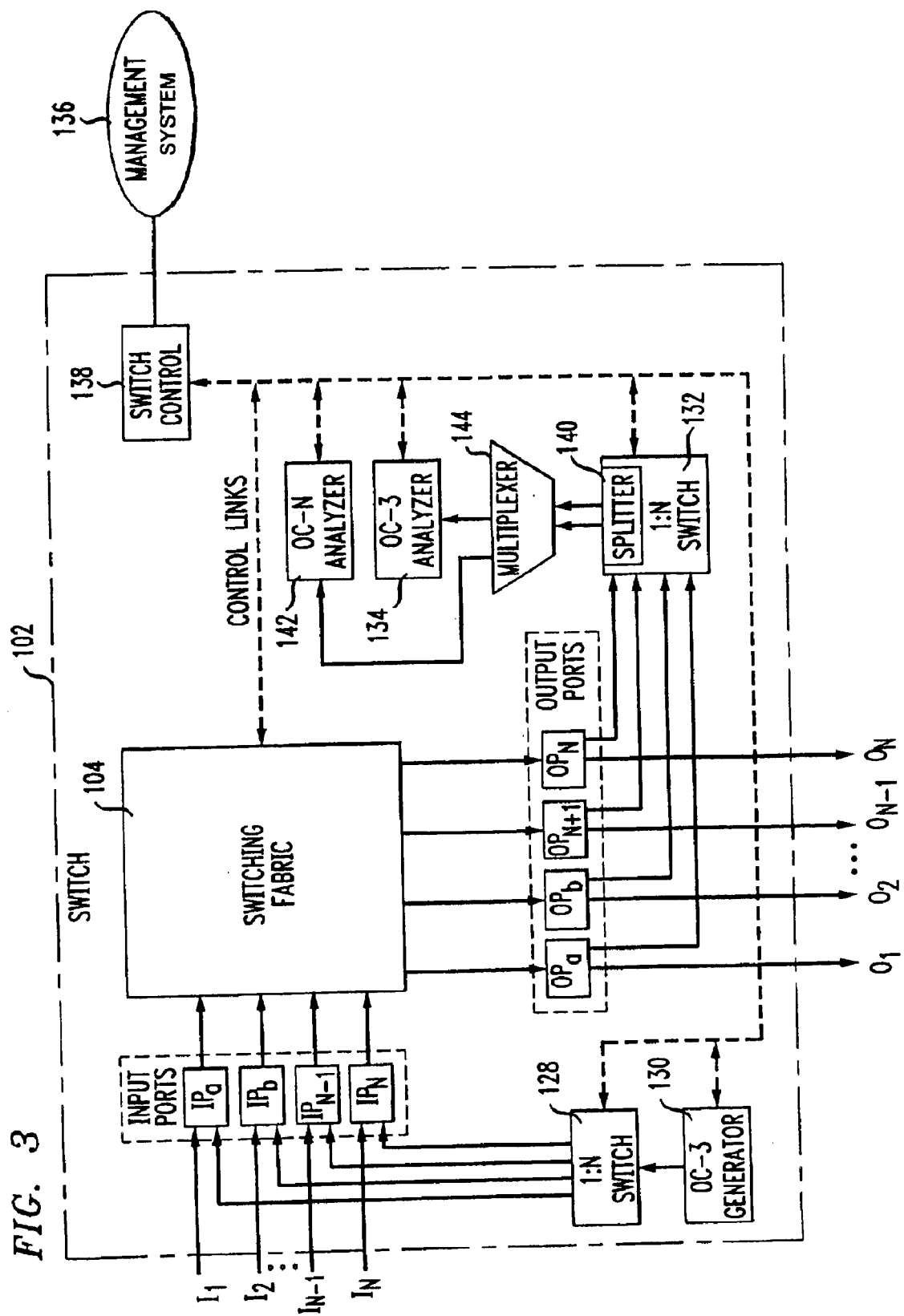
FIG. 3 is a schematic depiction of a transparent optical switch providing output signal performance monitoring in accordance with the present invention.

FIG. 3 shows a switch architecture similar to that shown in FIG. 2 with the addition of a signal splitter 140, which can form a part of the N:1 switch 132, and a us further signal analyzer 142. A multiplexer 144 can be coupled to the N:1 switch/splitter 132 to provide selected signals from the output ports OPa–N to the respective signal analyzers 134, 142 on a polling basis.

A predetermined portion of channel data through the switching fabric 104 can be tapped from the output ports OP to the N:1 switch 132. By controlling the multiplexer 144, the tapped data can be analyzed by the first or second signal analyzer 134,142 depending upon the date rate of the channel under test, for example. It is understood that a variety of signal analyzers, e.g., OC-48, OC-192, may be needed based upon the tapped data bandwidth.

Figure 4:
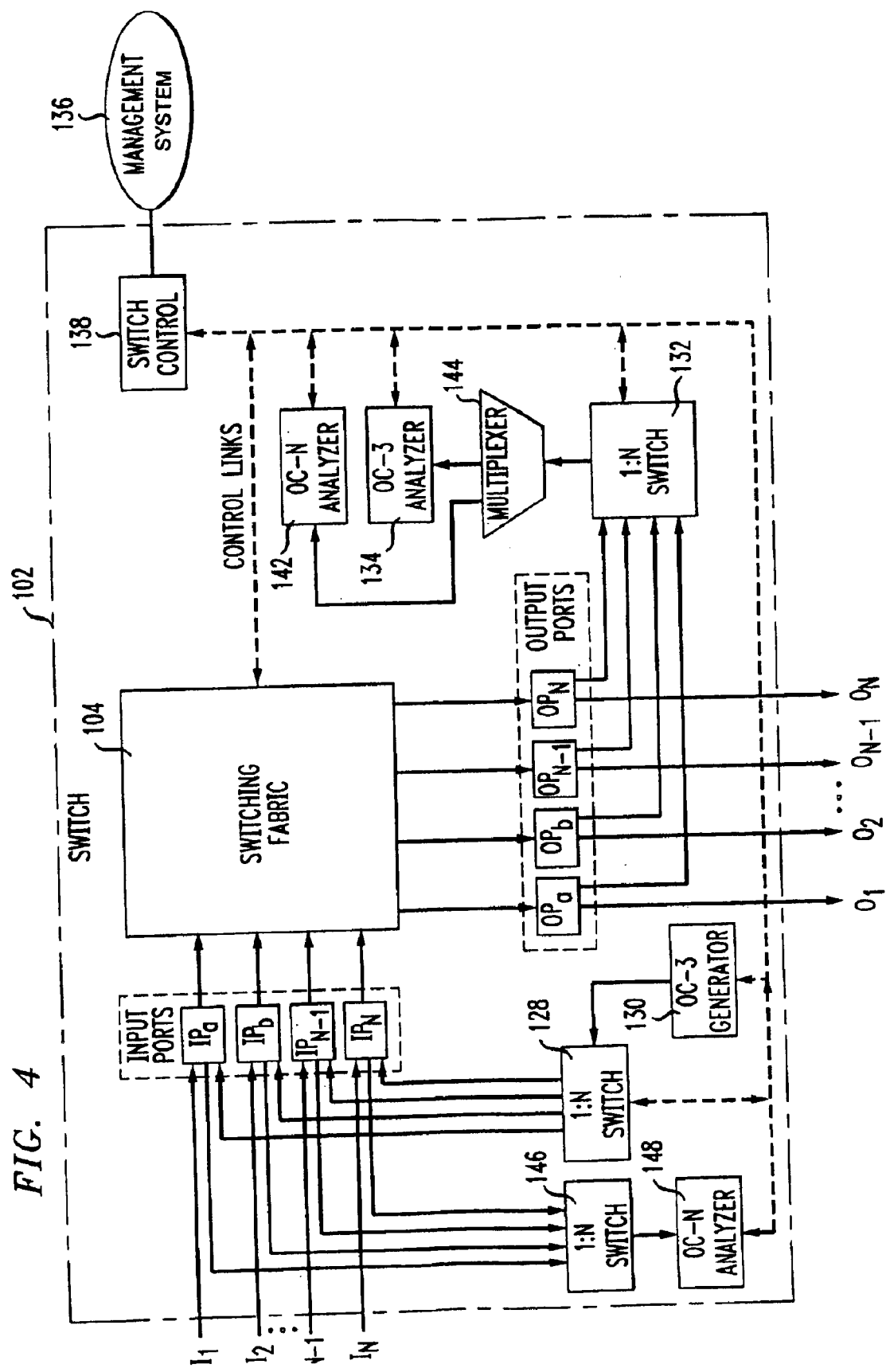
FIG. 4 is a schematic depiction of a transparent optical switch providing input and output signal performance monitoring in accordance with the present invention.

FIG. 4 shows a switch similar to that shown in FIG. 3 with the addition of an input side N:1 switch 146 and corresponding signal analyzer 148. With this arrangement, a desired portion, e.g., ten percent, of the data incoming to the switch 102 can be tapped and analyzed. The input side signal analyzer 148, which receives the tapped data from via the input side N:1 switch 146, can determine a BER for the tapped input data. In the illustrated embodiment, the input side N:1 switch 146 extracts incoming data from the input ports IPa–N on a polling basis, e.g., one port at a time.

Figure 5:
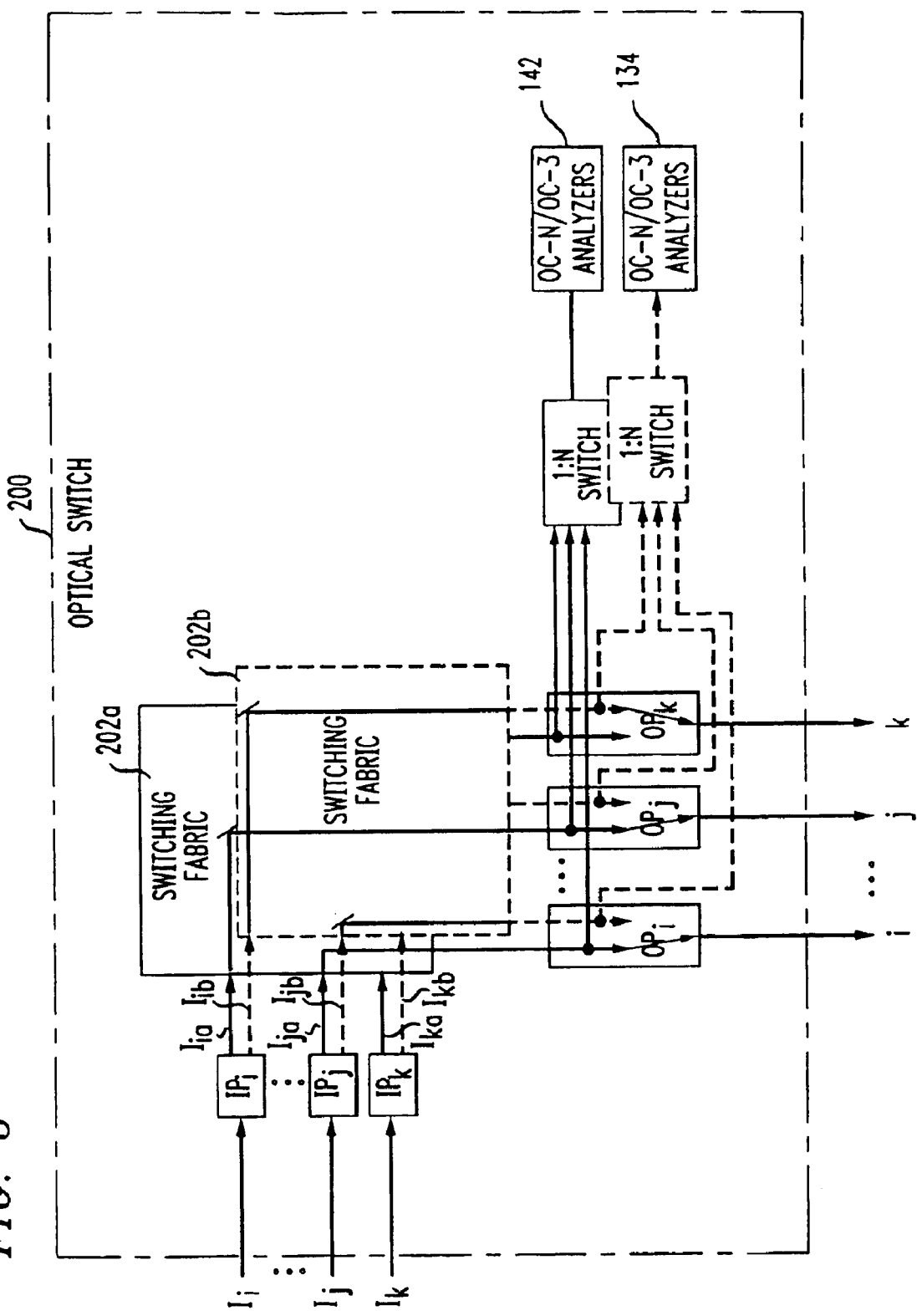
FIG. 5 is a schematic depiction of a transparent optical switch having first and second switch fabrics providing 1:2 broadcast capability for bi-directional connections in accordance with the present invention.

FIG. 5 shows a transparent optical switch 200 in accordance with the present invention having first and second switch fabrics 202a,b for providing 1:2 broadcast capability. The switch 200 is shown in a state in which a bi-directional port (IPi, OPi) is bridged to two ports (IPj, OPj) and (IPk, OPk). The output from the port IPi is connected to two ports OPj,OPk but in the receive direction of the I-th port (OPi) it receives signals only from port IPj.

Input ports IPi, . . . IPj, IPk split input signals Ii, . . . Ij, Ik into respective sets of first and second signals Iia,Iib, . . . Ija,Ijb,Ila,Ikb that are provided to the switch fabrics 202a, 202b. In the exemplary embodiment shown, the first signal Iia from the first input port IPi is handled by the first switch fabric 202a and the second signal Iib is handled by the second switching fabric 202b. The remaining input signals are likewise split and sent Id to respective switch fabrics 202a,b. The incoming signals are directed by the respective first and second switching fabrics 202a,b to particular output ports OPi–OPk. The output ports OP each include a switch for selecting a switch fabric 202a,b signal path.

The switching fabrics 202a,b receive the input signals and route them to selected output ports via mirror manipulation. Controlling mirrors in an optical switch to route signals is well known to one of ordinary skill in the art. In the exemplary embodiment shown, the first signal Iia from the first input port IPi is connected by the first switching fabric 202a to the second output port OPj. The second signal Iib from the first input port IPi is connected by the second switch fabric 202b to third output port OPk. Similarly, the first signal Ija from the second input port IPj is connected to the first output port OPi and the second signal Ijb is connected to first output port OPi. The third input port IPk, is not connected to an output port.

In general, each output port OP receives the same signal that is split by an input port IP from both switch fabrics and selects the operational signal. That way a failure of one of the switch fabrics does not affect the signal at the receiving port. In this embodiment the redundant switch fabrics are used to bridge a signal from one port to two outgoing ports. Each output port OPi . . . ,OPj,OPk selects a signal from one of the switching fabrics 202a,b for output by the switch. This arrangement provides a one to two broadcast function by utilizing redundant switch fabrics 202a,b.

Signal analyzers 134,142 can be coupled to the output ports OP, as described above, to enable performance monitoring, for example, of the signals from the switch fabrics. In one embodiment, switch information can be inserted into header information and verified by the signal analyzers.

Figure 6:
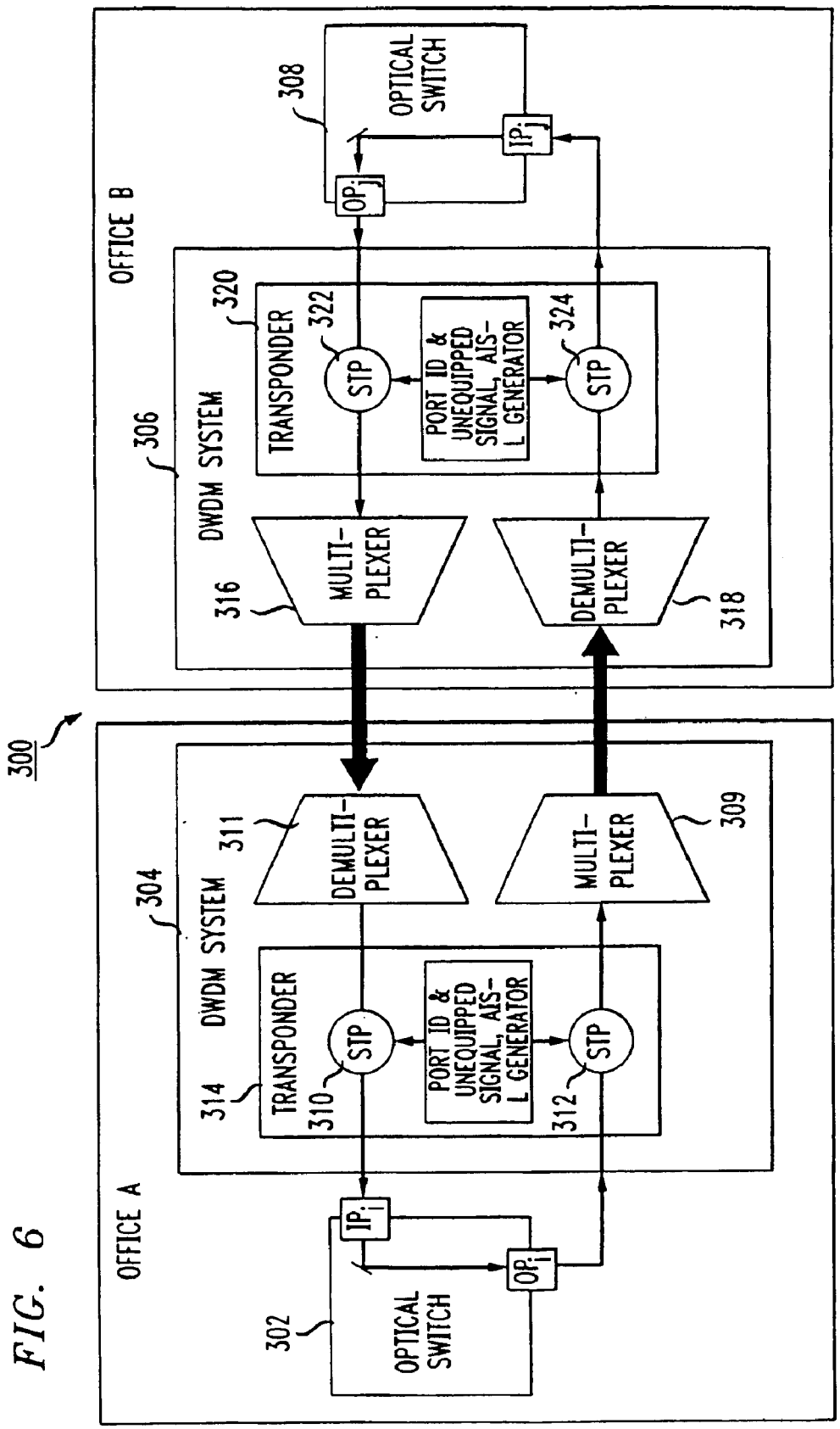
FIG. 6 is a schematic depiction of an optical communication system having transparent optical switches and optical networks providing unequipped signal generation in accordance with the present invention.

FIG. 6 shows a portion of an optical communication system 300, which can be a DWDM system, detecting and generating so-called unequipped or keep-alive signals in accordance with the present invention. In general, optical switches and DWDM networks work in concert to generate keep alive signals that can be looped back by the switches. When a switch port is connected to another switch port, but not currently carrying any bearer data traffic, an unequipped signal should be provided in the outgoing direction so that the link is continuously monitored and made ready to be used instantaneously.

The system 300 includes a first optical switch 302 coupled to a first DWDM system 304, which can be associated with a particular location such as office A. The first DWDM system 304 is coupled to a second DWDM system 306, which is connected to a second optical switch 308 associated with office B. The first DWDM system 304 includes a DWDM multiplexer 309 and a demultiplexer 311 along with first and second ports or section termination points 310,312. The first DWDM system 304 further includes a transponder 314 that can detect unequipped conditions and generate unequipped signals.

The second DWDM network 306 similarly includes a DWDM multiplexer and demultiplexer 316,318, transponder 320, and section termination points 322,324. The second DWDM network 306 is connected to the second optical switch 308. Port-to-port connections between the first and second switches 302,308 enable bi-directional communication between Office A and Office B.

In general, an unequipped signal is inserted into an output port of an optical switch when the outport is not connected to another port within the same switch and carrying a live signal. For example, an unequipped signal is inserted into a first output port OPi of the first switch 302 when it is not connected to another port within the first switch. Similarly, an unequipped signal is inserted into a first output port OPj of the second switch 308 when this port is not connected to another port within the second by switch 308.

In operation, the first DWDM port 310 inserts its port ID and unequipped status indication into a particular set of overhead bytes, for example, in the signal going towards the first switch 302. When the first switch 302 output port OPi is not connected to another port within the switch, the corresponding input port Pi is connected, i.e. looped back, to the output port OPi. The inserted signal from the first port 310 in the first DWDM network 304 is thus received at the second port 312.

The signal overhead is examined to extract the port ID and if the first DWDM network 304 finds the same ID at the second port 312 as the one inserted at the first port 310 then the first DWDM network continues to insert the unequipped signal status at the first port 310. If on the other hand, the same port ID is not received at the second or input port 312, then the first DWDM network 304 determines that the output port OPi is no longer connected to the input port IPi at the first optical switch. The first DWDM network 304 then removes the unequipped status indication at the first port 310 and allows the received signal from an output port 322 of the second DWDM network 306 to pass through the first DWDM network input port 310 towards the input port IPi of the first optical switch.

The input port 312 passes through the signal received from the first switch output port OPi. However, the corresponding overhead information is read at the second port 312 to check for a change in status. Similarly, the same action takes place at transponders at input and output ports 322,320 of the second DWDM network.

Figure 7:
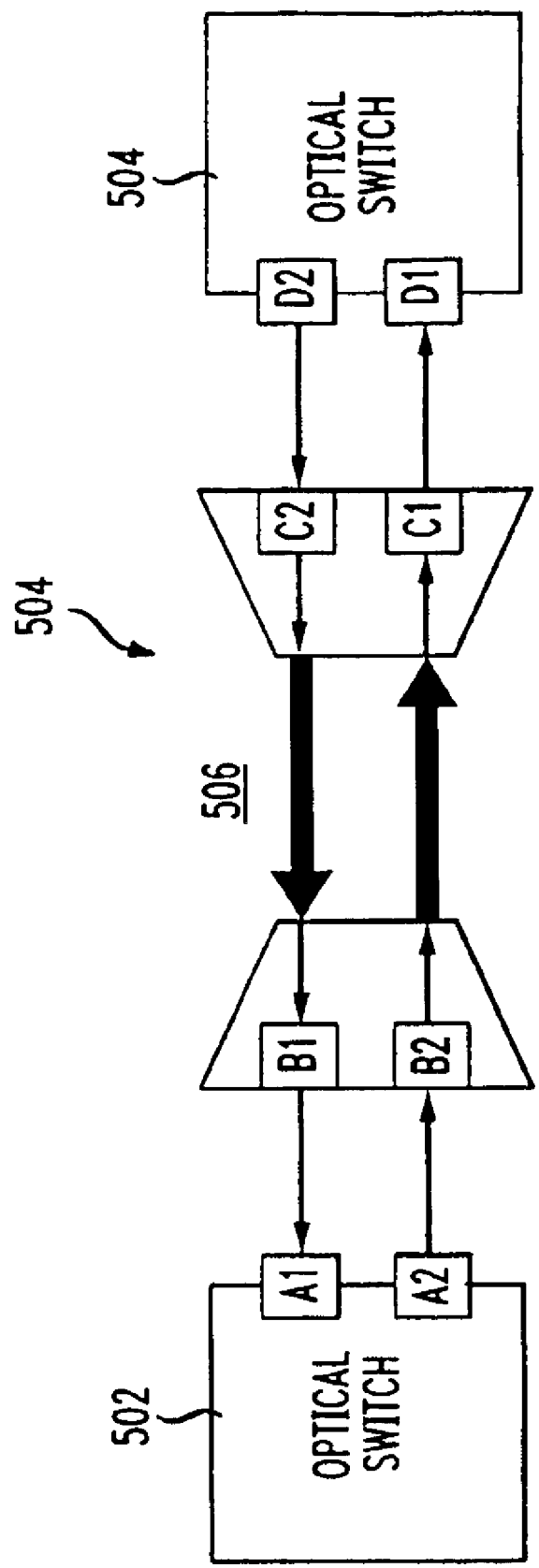
FIG. 7 is a schematic depiction of an optical communication system having optical switches and optical networks that combine to provide automatic network topology discovery in accordance with the present invention.

FIG. 7 shows a portion of a DWDM communication system 500 having first and second optical switches 502,504 with automatic topology discovery in accordance with the present invention. The first and second optical switches 502,504 are connected by a DWDM system 506. A signal path from the second switch 504 to the first switch 502 includes a series of ports including a switch output port D2, first and second DWDM ports C2, B1, and switch input port A1. Similarly, a path connecting the switches in the opposite direction also includes a series of ports A2:B2:C1:D1, as shown.

In general, port ID information is inserted into the data signal overhead packets, such as into J0 or another SOH, during travel to the destination switch. As known to one of ordinary skill in the art, J0 and SOH are header formats specified in SONET and SDH standards. The switches 502,504 extract the port ID information, from which channel connection information can be determined.

In an exemplary embodiment, each DWDM port includes an optoelectronic transponder that can convert optical signals to electrical signals and convert electrical signals to optical signals. The transponders enable the ports to insert port ID information within a particular set of overhead bytes in the electrical domain and to provide the signal in optical format into the DWDM system. Thus, each port can insert ID information into the optical data stream and extract ID information from the data stream on a polling basis using signal generators and signal analyzers as shown and described above.

In the illustrated embodiment, a first input port A1 of the first switch 502 receives data from a near-end DWDM transmit port B1, which receives data from a far-end DWDM receive port C2. The first switch 502 transmits data to a near-end DWDM transmit port B2 via switch output port A2.

Similarly, a first input port D1 of the second switch 504 receives data from a DWDM port C1, which receives data from a further DWDM port B2. The second switch 504 transmits data from an output port D2 to a DWDM port C2. Each port, or one port having information on other ports, can insert port ID information into the data stream. The optical switches 502,504, via signal analyzers discussed in FIG. 3, can extract port ID information to obtain connection information on a polling basis. It is understood that receive/transmit ports, e.g., B1/B2 may have identical IDs.

In this arrangement, the first switch 502 should determine that its input port A1 is connected to the output port D2 of the second switch 504 without the second switch 504 having to generate any signal with the D2 port ID. The DWDM port C2 inserts its own ID in the particular set of overhead bytes allocated for this purpose. At the next DWDM all port B1, the DWDM network then adds the first switch side port IDs B1,B2 in the same set of overhead bytes. When the first switch 502 reads these overheads bytes, it creates a 4-tuple ID A1:B1:B2:C2. The first switch 502 then sends this ID 4-tuple to the second switch 504 using an out of band communication channel (not shown). Similarly, the second switch 504 sends the D1:C1:C2:B2 ID 4-tuple to the first switch 502. When the switches 502 and 504 send the messages they attach the switch IDs with the port ID 4-tuples so that the receiving switch can identify the originator of the message.

The first and second switches 502,504 then broadcast this information to all other switches. Each switch with the received information from other switches and the ID information read from the incoming ports can then determine port connectivity. For example, the first switch 502 receives the concatenated ID information D1:C1:C2:B2 from the second switch 504 and compares the last two entries in reverse order for a match. In this case, the first switch 502 finds that D1:C1:C2:B2 matches its own concatenated ID, i.e., A1:B1:B2:C2, from the input port A1. From this match, the first switch 502 determines the output port D2 of the second switch 504 is connected to a corresponding input port A1. A connection between ports A2, D1 is similarly determined. Thus, this particular embodiment does not require the switches 502 and 504 to generate any signals to determine connectivity. That is, this arrangement enables switches to exchange port connection information to determine the network topology automatically.

Figure 8:
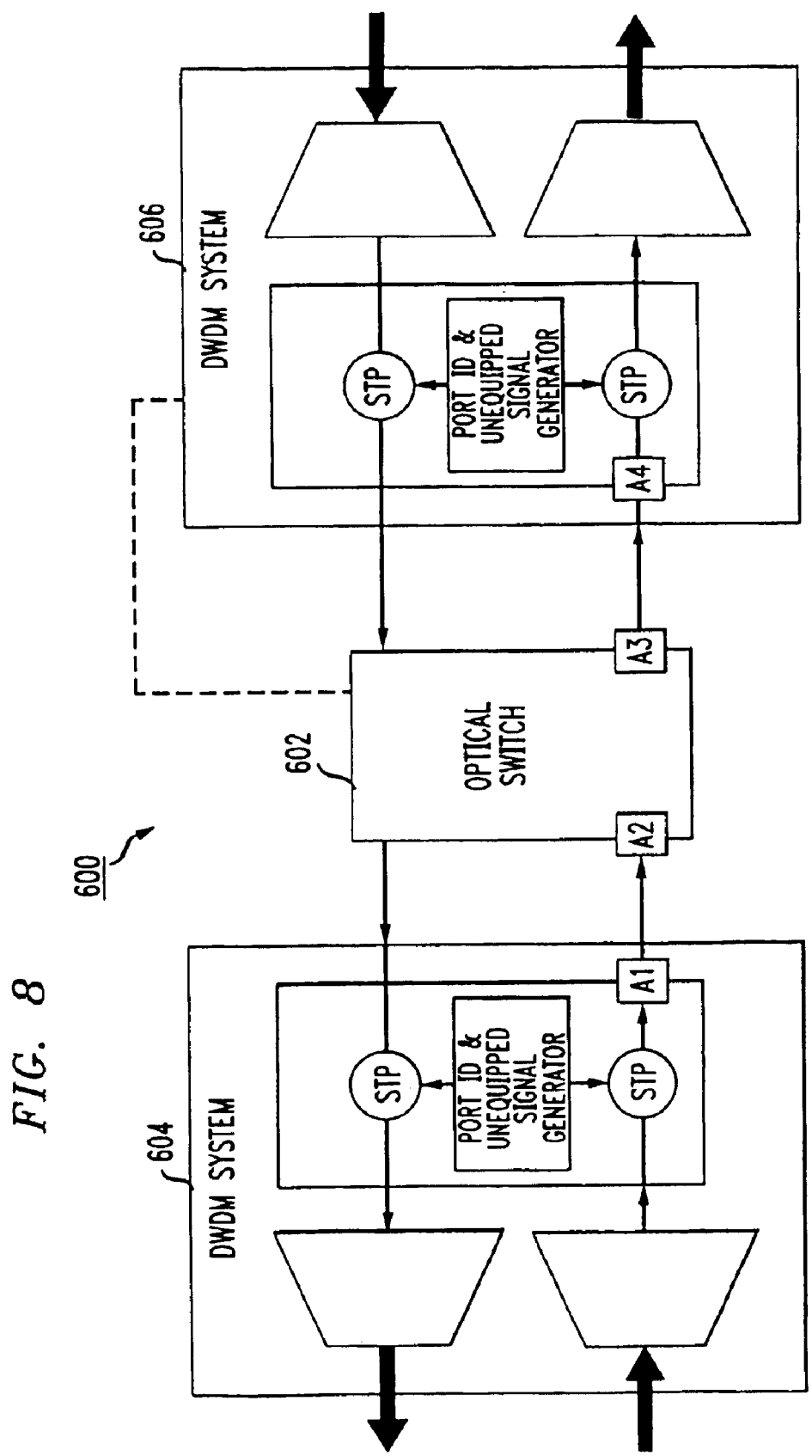
FIG. 8 is a schematic depiction of an optical communication system having an optical switch and optical networks providing fault detection and isolation in accordance with the present invention.

FIG. 8 shows an optical communication system 600 including an optical switch 602 disposed between first and second DWDM networks 604,606 that provides enhanced fault detection and isolation in accordance with the present invention. The system should detect and isolate faults within a replaceable unit in the switch 602. Faults include both signal degrade and signal fail conditions. It is understood that the fault detection and isolation does not need to be instantaneous.

Faults between the DWDM systems 604,606 are typically detected using performance monitoring at section termination points. It is thus necessary to isolate faults to within a section A1–A2,A3–A4 between two DWDM ports 604 and 606, for example. If performance monitoring is implemented both at the input and the output ports A1,A2, then the fault is isolated within sections A1–A2, A2–A3 and A3–A4. If, however, performance monitoring is implemented only at the output port as discussed in FIG. 3, then the fault is isolated by correlation of the internal signal (e.g. OC-3 in FIG. 3) performance and the bearer signal (e.g. OC-N in FIG. 3) performance at the output port. For example, if the OC-3 internal signal is good but the OC-N bearer signal is bad, then the fault is located in section A1–A2. If both the OC-3 and OC-N signals are bad then the fault is in section A2–A3. If on the other hand both signals are good then the network management system, not shown, can determine that the fault is in section A3–A4.

Figure 9:
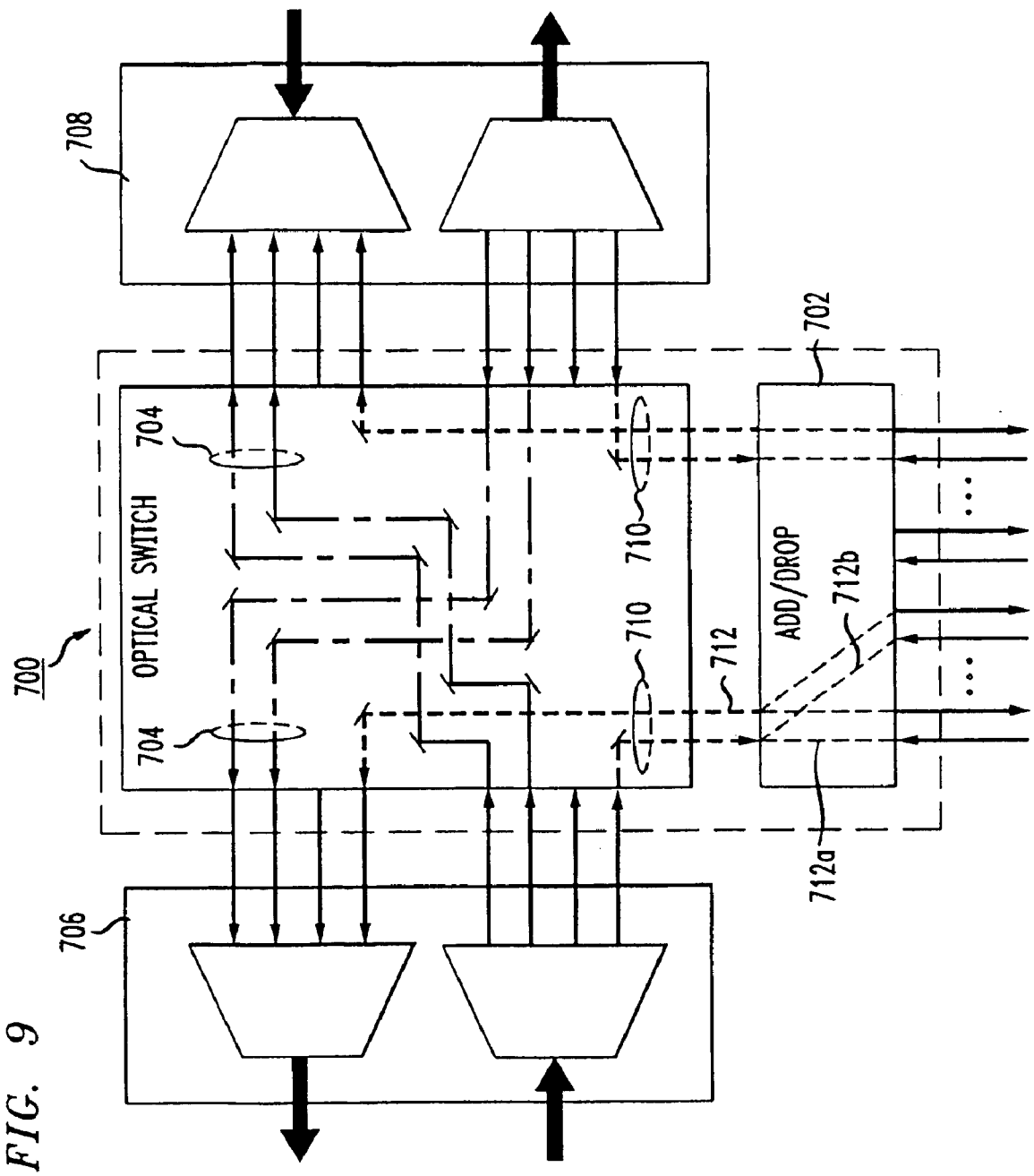
FIG. 9 is a schematic depiction of an optical communication system having an optical switch and optical networks providing mulitplexing and switching within the add/drop ports in accordance with the present invention.

FIG. 9 shows an optical switch 700 having an add/drop port signal multiplexer 702 in accordance with the present invention. The add/drop multiplexer 700 may include an electronic switch to switch signals within the drop signals. The switch 700 includes pass through paths 704 between first and second DWDM networks 706,708 and drop signal paths 710 from the switch 700 to the add/drop multiplexer 702. The add/drop multiplexer converts the optical signals from the switch to electrical signals.

With this arrangement, a plurality of drop signals having a speed lower than the network transport speed can be multiplexed to achieve increased efficiency and lowered costs. Increased efficiency and lower cost is achieved by using only one wavelength for the higher speed multiplexed signal for the long distance WDM network. By having the ability to access the overhead bits within the signals dropped at the switch node, it is possible to detect fault on the connection of a signal that traverses multiple optical switches on its path. Note that the intermediate nodes on the signal path do not have access to the overhead bits of the signal because it is passed through the switch without optical to electrical conversion. With fast detection capability at the end switch of the signal path, the switch 700 can fast reroute the signal through an alternative route when the original signal fails. It is not necessary for the end switch to know where the fault occurred.

In another aspect of the invention, with automatic topology discovery and bit level overhead access at drop ports, so-called fast provisioning can be achieved on request by client routers, for example. In one embodiment, an optical network can include control channels having a termination point in each optical network disposed between switches. These channels can provide a routing network for carrying fast provisioning information, network management, restoration messages, and other control messages.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An optical switch device, comprising:
   a switch fabric;
   a plurality of input ports through which incoming data contained in a bearer signal passes to the switch fabric, the plurality of input ports to receive the data from a wave division demultiplexer;
   a plurality of output ports through which outgoing data passes from the switch fabric to transmit the data to a wave division multiplexer;
   a first demultiplexing device coupled to at least one of the plurality of input ports to inject an optical connection verification signal into the switch fabric;
   a signal generator coupled to the first demultiplexing device for injecting the connection verification signal into the switch fabric at a frequency that is different from a frequency of the bearer signal;
   a first multiplexing device coupled to at least one of the plurality of output ports; and a first signal analyzer coupled to the first multiplexing device for analyzing the connection verification signal injected by the signal generator; and
   a second demultiplexing device coupled to at least one of the plurality of input ports and a second signal analyzer coupled to the second demultiplexing device for analyzing data extracted from the input ports on a polling basis.

2. A method for achieving bit level access to data in an optical switch, comprising:
   coupling a plurality of input ports through which incoming data contained in a bearer signal passes to a switch fabric, the plurality of input ports receiving the data from a wave division demultiplexer;
   coupling a plurality of output ports through which outgoing data passes from the switch fabric to transmit the data to a wave division multiplexer;
   coupling a first demultiplexing device to at least one of the plurality of input ports to inject an optical connection verification signal into the switch fabric;
   coupling a signal generator to the first demultiplexing device for injecting the connection verification signal into the switch fabric at a frequency that is different from a frequency of the bearer signal;
   coupling a first multiplexing device to at least one of the plurality of output ports;
   coupling a first signal analyzer to the first multiplexing device for analyzing the connection verification signal injected by the signal generator; and
   coupling a second demultiplexing device to at least one of the plurality of input ports and a second signal analyzer coupled to the second demultiplexing device for analyzing data extracted from the input ports on a polling basis.

* * * * *